United States Patent
Stapleton (10) Patent No.: US 9,863,265 B2
(45) Date of Patent: Jan. 9, 2018

(54) SHROUD ASSEMBLY AND SHROUD FOR GAS TURBINE ENGINE

(71) Applicant: General Electric Company, Schenectady, NY (US)

(72) Inventor: David Scott Stapleton, Boston, MA (US)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 14/686,800

(22) Filed: Apr. 15, 2015

(65) Prior Publication Data

US 2016/0305265 A1    Oct. 20, 2016

(51) Int. Cl.

| | |
|---|---|
| *F02C 1/00* | (2006.01) |
| *F01D 11/08* | (2006.01) |
| *F01D 9/04* | (2006.01) |
| *F01D 25/24* | (2006.01) |
| *F01D 5/02* | (2006.01) |
| *F01D 25/00* | (2006.01) |
| *F02C 3/04* | (2006.01) |
| *F04D 29/32* | (2006.01) |

(52) U.S. Cl.
CPC ............... *F01D 11/08* (2013.01); *F01D 5/02* (2013.01); *F01D 9/04* (2013.01); *F01D 25/005* (2013.01); *F01D 25/246* (2013.01); *F02C 3/04* (2013.01); *F04D 29/321* (2013.01); *F05D 2220/32* (2013.01); *F05D 2240/11* (2013.01); *F05D 2240/35* (2013.01); *F05D 2300/6033* (2013.01); *Y02T 50/672* (2013.01)

(58) Field of Classification Search
CPC . F01D 9/04; F01D 9/041; F01D 11/08; F01D 5/143; F01D 19/02
See application file for complete search history.

(56) References Cited

U.S. PATENT DOCUMENTS

| | | | |
|---|---|---|---|
| 5,071,313 A | * | 12/1991 | Nichols ................ F01D 25/246 415/134 |
| 5,531,568 A | | 7/1996 | Broadhead |
| 5,584,651 A | | 12/1996 | Pietraszkiewicz |
| 5,641,267 A | * | 6/1997 | Proctor ................... F01D 11/08 415/173.1 |
| 5,762,472 A | | 6/1998 | Pizzi et al. |

(Continued)

OTHER PUBLICATIONS

European Search Report and Opinion issued in connection with corresponding EP Application No. 16164076.8 dated Aug. 26, 2016.

*Primary Examiner* — Gerald L Sung
(74) *Attorney, Agent, or Firm* — General Electric Company; William Scott Andes (57) ABSTRACT

Shroud assemblies and shrouds for gas turbine engines are provided. A shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a rib disposed between and in contact with the forward flange and the rear flange.

12 Claims, 7 Drawing Sheets

(56) References Cited

U.S. PATENT DOCUMENTS

| | | | |
|---|---|---|---|
| 6,602,050 B1 * | 8/2003 | Scheurlen | F01D 11/08 415/173.1 |
| 6,814,538 B2 | 11/2004 | Thompson | |
| 6,884,026 B2 | 4/2005 | Glynn et al. | |
| 2004/0047725 A1 * | 3/2004 | Tomita | F01D 11/005 415/116 |
| 2005/0141989 A1 * | 6/2005 | Sayegh | F01D 9/04 415/116 |
| 2009/0285675 A1 | 11/2009 | Lewis et al. | |
| 2010/0047061 A1 | 2/2010 | Morrison | |
| 2013/0051979 A1 * | 2/2013 | Durocher | F01D 5/08 415/115 |
| 2013/0251939 A1 * | 9/2013 | Kleinow | B32B 18/00 428/121 |
| 2014/0301840 A1 | 10/2014 | Hein et al. | |
| 2016/0097303 A1 * | 4/2016 | Baldiga | F01D 11/08 416/182 |

* cited by examiner

SHROUD ASSEMBLY AND SHROUD FOR GAS TURBINE ENGINE

FIELD OF THE INVENTION

The present subject matter relates generally to a shroud assemblies and shrouds for gas turbine engines. More particularly, the present subject matter relates to improved shroud structures.

BACKGROUND OF THE INVENTION

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

In general, the HP turbine and LP turbine may additionally include shroud assemblies which further define the hot gas path. A clearance gap may be defined between the shroud of a shroud assembly and the rotatable turbine components of an associated stage of rotatable turbine components. The shroud is typically retained within the gas turbine engine by a shroud hanger, which in turn is coupled to various other components of the engine.

One issue with presently known shroud assemblies (and in particular ceramic matrix composite shroud assemblies) is the structural rigidity of the shrouds as they experience relative substantial loading during operation of the engine. Recently developed shrouds, for example, have utilized an "open" style wherein flanges at the forward and rear ends of a shroud body extend from the shroud body for coupling the shroud to the hanger. Distal ends of the flanges are free ends, not coupled to other components (such as cross-beams) of the shroud. While such open style designs provide numerous advantages with respect to manufacturability, concerns have arisen with respect to the structural rigidity of these shrouds. For example, pressure differentials during operation of the engine cause relatively substantial loading on the shrouds. Further, such loading can be uneven on the surface of the shroud. These loads can cause stresses the intersections of the flanges and shroud body, which can lead to shroud damage. Such issues are of increased concern when the shrouds are formed from ceramic matrix composite materials.

Accordingly, improved shrouds and shroud assemblies for gas turbine engines are desired. In particular, open style shrouds with improved structural rigidity are desired.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a shroud for a gas turbine engine is provided. The shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a rib disposed between and in contact with the forward flange and the rear flange.

In accordance with another embodiment of the present disclosure, a shroud assembly for a gas turbine engine is provided. The shroud assembly includes a hanger which includes a forward hanger arm, a rear hanger arm axially spaced from the forward hanger arm, a hanger body extending between the forward hanger arm and the rear hanger arm, and a flange extending from the hanger body. The hanger further includes a bore hole defined in the flange. The shroud assembly further includes a shroud. The shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a rib disposed between and in contact with the forward flange and the rear flange. The shroud assembly further includes a pin extending through the bore hole of the hanger and at least one of the bore hole of the forward flange or the bore hole of the rear flange.

In accordance with another embodiment of the present disclosure, a gas turbine engine is provided. The gas turbine engine includes a compressor, a combustion section, a turbine, and a shroud disposed in one of the compressor or the turbine. The shroud includes a shroud body which includes a forward surface, a rear surface axially spaced from the forward surface, an inner surface extending between the forward surface and the rear surface, and an outer surface extending between the forward surface and the rear surface and radially spaced from the inner surface. The shroud further includes a forward flange extending from the outer surface of the shroud body, and a rear flange extending from the outer surface of the shroud body, the rear flange axially spaced from the forward flange. The shroud further includes a rib disposed between and in contact with the forward flange and the rear flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Figure 1:
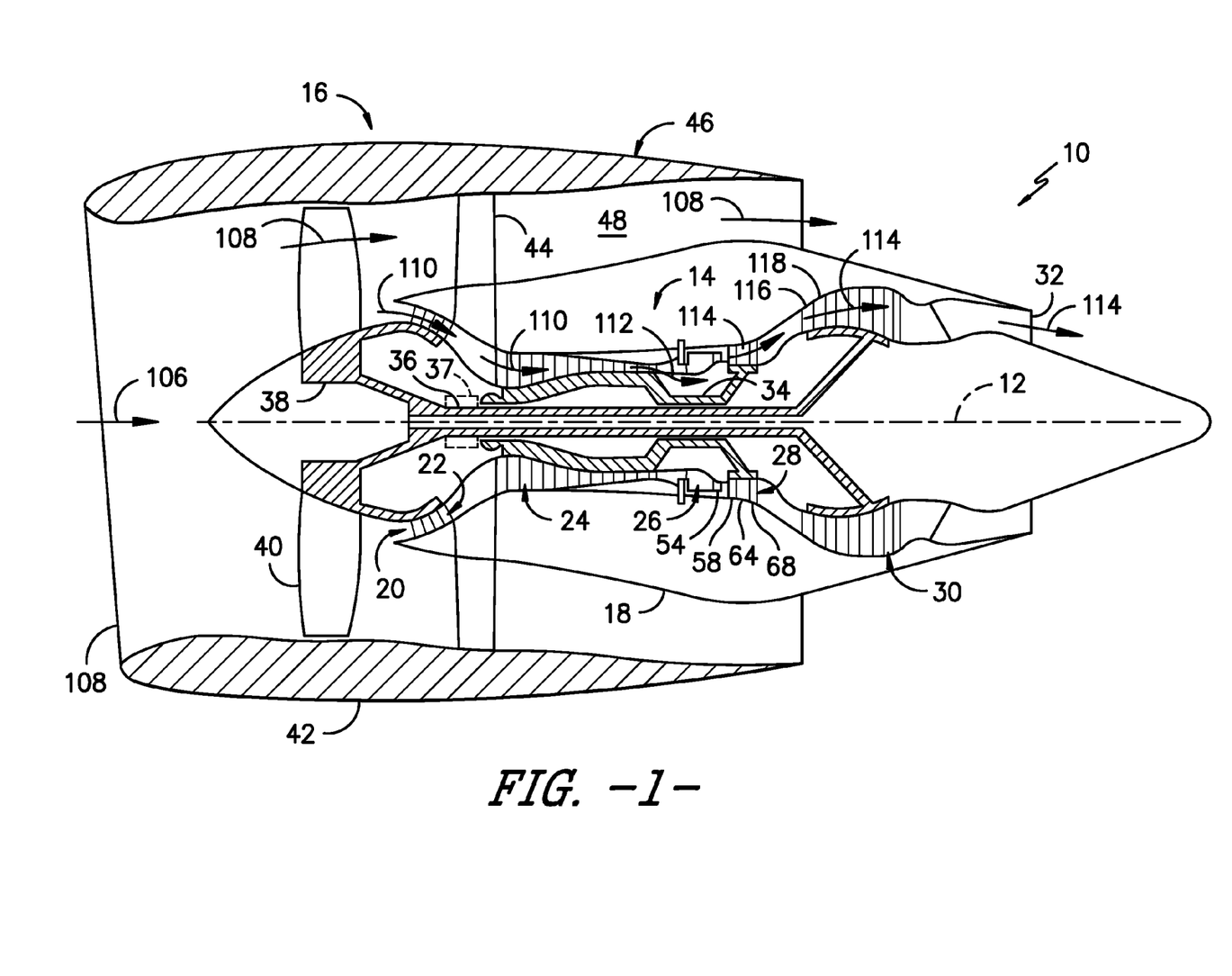
FIG. 1 is a schematic cross-sectional view of a gas turbine engine in accordance with one embodiment of the present disclosure.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The (LP) spool 36 may also be connected to a fan spool or shaft 38 of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within engine 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the guide vanes 44) may extend over an outer portion of the gas turbine engine 14 so as to define a bypass airflow passage 48 therebetween.

Figure 2:
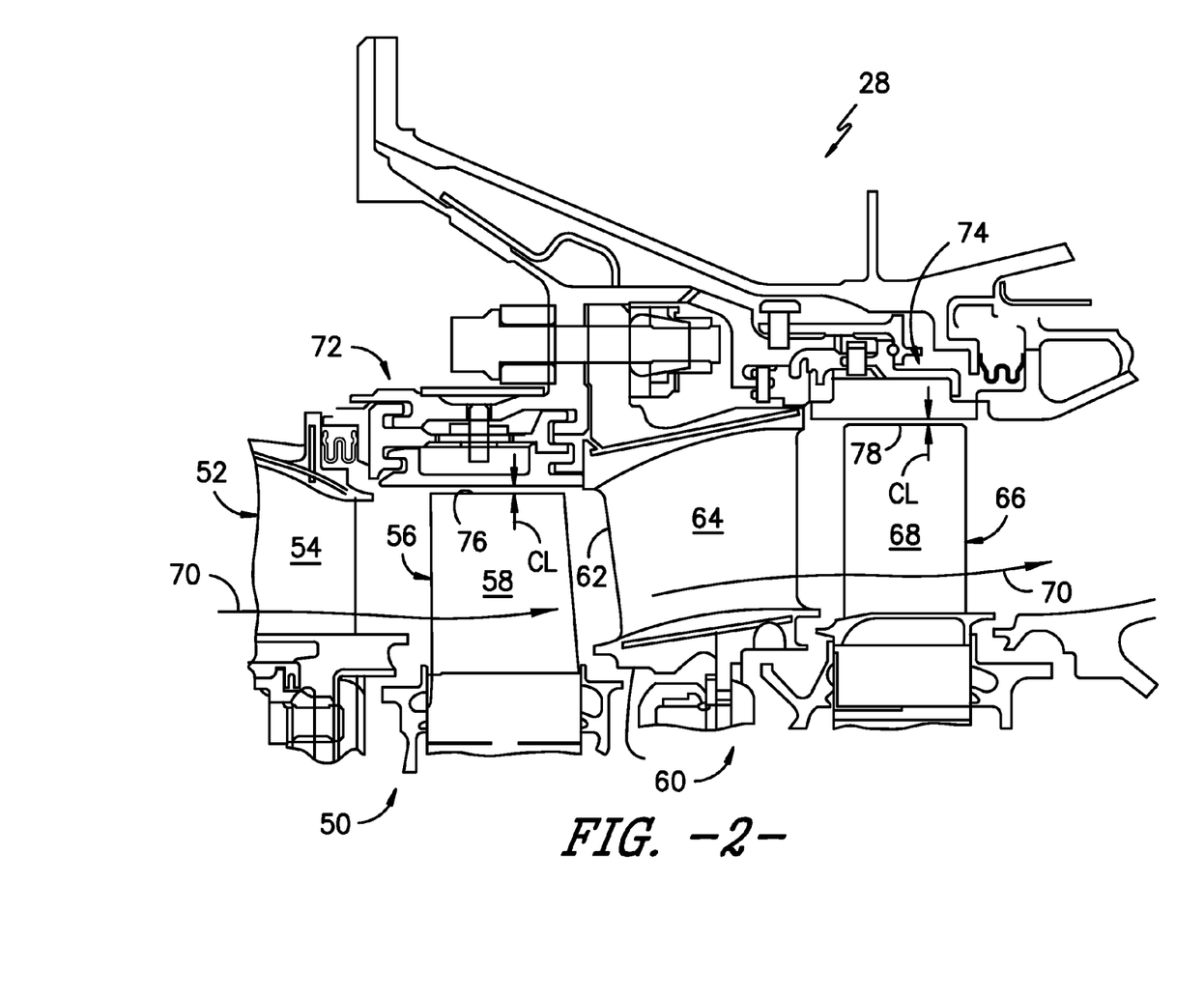
FIG. 2 is an enlarged cross sectional side view of a high pressure turbine portion of a gas turbine engine in accordance with one embodiment of the present disclosure.

FIG. 2 provides an enlarged cross sectioned view of the HP turbine 28 portion of the gas turbine engine 14 as shown in FIG. 1, as may incorporate various embodiments of the present invention. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28.

As further shown in FIG. 2, the HP turbine may include one or more shroud assemblies, each of which forms an annular ring about an annular array of rotor blades. For example, a shroud assembly 72 may form an annular ring around the annular array 56 of rotor blades 58 of the first stage 50, and a shroud assembly 74 may form an annular ring around the annular array 66 of turbine rotor blades 68 of the second stage 60. In general, shrouds of the shroud assemblies 72, 74 are radially spaced from blade tips 76, 78 of each of the rotor blades 68. A radial or clearance gap CL is defined between the blade tips 76, 78 and the shrouds. The shrouds and shroud assemblies generally reduce leakage from the hot gas path 70.

It should be noted that shrouds and shroud assemblies may additionally be utilized in a similar manner in the low pressure compressor 22, high pressure compressor 24, and/or low pressure turbine 30. Accordingly, shrouds and shrouds assemblies as disclosed herein are not limited to use in HP turbines, and rather may be utilized in any suitable section of a gas turbine engine.

Referring now to FIGS. 3 through 10, improved shroud assemblies 100 and shrouds 102 therefor are disclosed. Shroud assemblies 100 as disclosed herein may be utilized in place of shroud assemblies 72, 74, as discussed above, or any other suitable shroud assemblies in an engine 10. Similarly, shrouds 102 as disclosed herein may be utilized in place of shrouds 76, 78, as discussed above, or any other suitable shrouds in an engine 10.

Shrouds 102 and shroud assemblies 100 in accordance with the present disclosure provide a number of advantages. In particular, shrouds 102 in accordance with the present disclosure are "open"-style shrouds which have improved structural rigidity. For example, such shrouds advantageously include ribs which provide stiffening effects to the shrouds, thus reducing stresses at flange-body intersections and reducing resulting damage to the shrouds as a result of loading experienced by the shrouds during engine operation. Shroud designs in accordance with the present disclosure are particularly advantageous when the shrouds are formed from ceramic matric composite ("CMC") materials.

Figure 3:
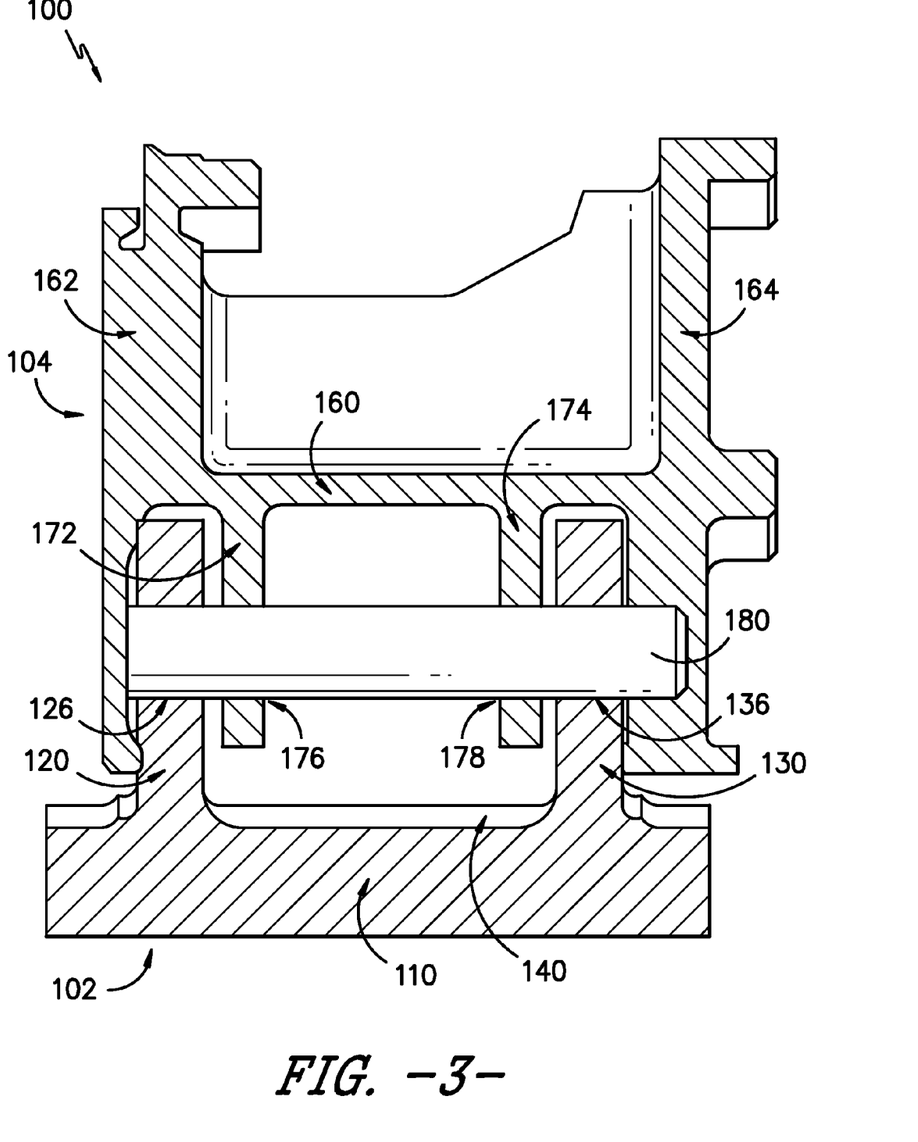
FIG. 3 is a cross-sectional view of a shroud assembly in accordance with one embodiment of the present disclosure.

FIG. 3 illustrates a shroud assembly 100, which includes a shroud 102 and a hanger 104 in accordance with the present disclosure. FIGS. 4 through 10 illustrate various embodiments of a shroud 102 in accordance with the present disclosure. A shroud 102 in accordance with the present disclosure may include, for example, a shroud body 110, a forward flange 120, and a rear flange 130. Further, shroud 102 may include one or more ribs 140. In exemplary embodiments, the shroud body 110, flanges 120, 130 and ribs 140 (and shroud 102 in general) may be formed from a CMC material, although in alternative embodiments the shroud body 110, flanges 120, 130 and ribs 140 (and shroud 102 in general) may be formed from another suitable material such as a metal, etc. In particular, in exemplary embodiments, shroud body 110, flanges 120, 130 and ribs 140 may be integral and thus generally formed as a single component.

Shroud body 110 may include a forward surface 112 and a rear surface 114. The rear surface 114 is axially spaced from the forward surface 112, such as generally along the centerline 12 when in the engine 10. An inner surface 116 and an outer surface 118 may each extend between the forward surface 112 and the rear surface 114. The outer surface 118 is radially spaced from the inner surface 116. Inner surface 116 may, when the shroud 102 is in engine 10, be exposed to the hot gas path 70, while outer surface 118 is thus radially spaced from the hot gas path 70.

Forward flange 120 and rear flange 130 may each extend from the shroud body 110, such as from the outer surface 118 thereof. Rear flange 130 may be axially spaced from forward flange 120. Further, forward flange 120 may be generally positioned proximate the forward surface 112 of the body 110, while rear flange 130 is generally positioned proximate the rear surface 114 of the body 110. Each flange 120, 130 may include a forward surface 122, 132 (respectively) and a rear surface 124, 134 respectively. As shown, the flanges 120, 130 may each extend generally circumferentially along their lengths, and thus be circumferentially oriented.

Further, one or more bore holes 126, 136 may be defined in each flange 120, 130, respectively. Each bore hole 126, 136 may, for example, extend generally axially through the associated flange 120, 130 between the associated forward surface 122, 132 and associated rear surface 124, 134. The bore holes 126, 136 are generally utilized for coupling the shroud 102 to the hanger 104. For example, pins may be inserted into the bore holes 126, 136 and associated bore holes of the hanger 104 to couple the shroud 102 to the hanger 104.

Referring briefly to FIG. 3, an exemplary hanger 104 is illustrated. Hanger 104 generally is coupled to and supports the shroud 102 in the engine 10, and is itself supported by various other components in the engine 10. Hanger 104 may include a hanger body 160, and a forward hanger arm 162 and rear hanger arm 164 extending from the hanger body 160, such as radially outward (away from hot gas path 70) from the hanger body 160. Hanger body 160 may thus extend between the arms 162, 164. The rear arm 164 may be axially spaced from the forward arm 162, as shown.

Hanger 104 may further include one or more flanges extending from the hanger body 1650, such as radially inward (towards hot gas path 70) from the hanger body 160. For example, a forward flange 172 and a rear flange 174 may extend from the hanger body 160. Rear flange 174 may be axially spaced from forward flange 172. Forward flange 172 may be proximate forward hanger arm 162 and rear flange 174 may be proximate rear hanger arm 164. One or more bore holes 176, 178 may be defined in the flanges 172, 174, respectively.

When assembled, the bore holes 126, 136 of the shroud flanges 120, 130 may generally align with the associated hanger bore holes 176, 178. For example, bore holes 126 may align with bore holes 176, and bore holes 136 may align with bore holes 178. One or more pins 180 may be inserted through and thus extend through the associated bore holes to couple the hanger 104 and shroud 102 together. In some embodiments as shown, a pin 180 may extend through aligned bore holes 126, 176, 136 and 178. Alternatively, separate pins may be utilized for aligned bore holes 126, 176 and aligned bore holes 136, 178.

Figure 4:
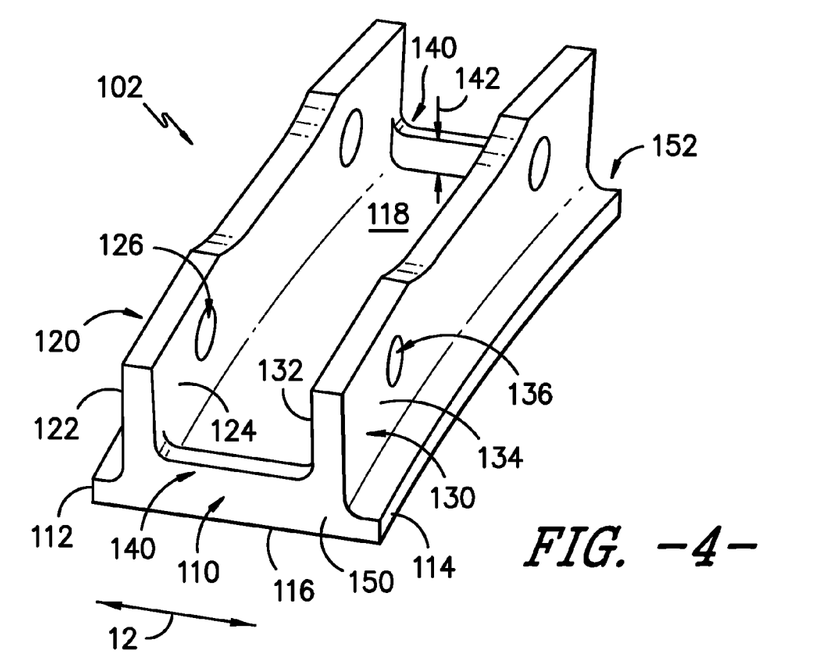
FIG. 4 is a perspective view of a shroud in accordance with one embodiment of the present disclosure.
Figure 5:
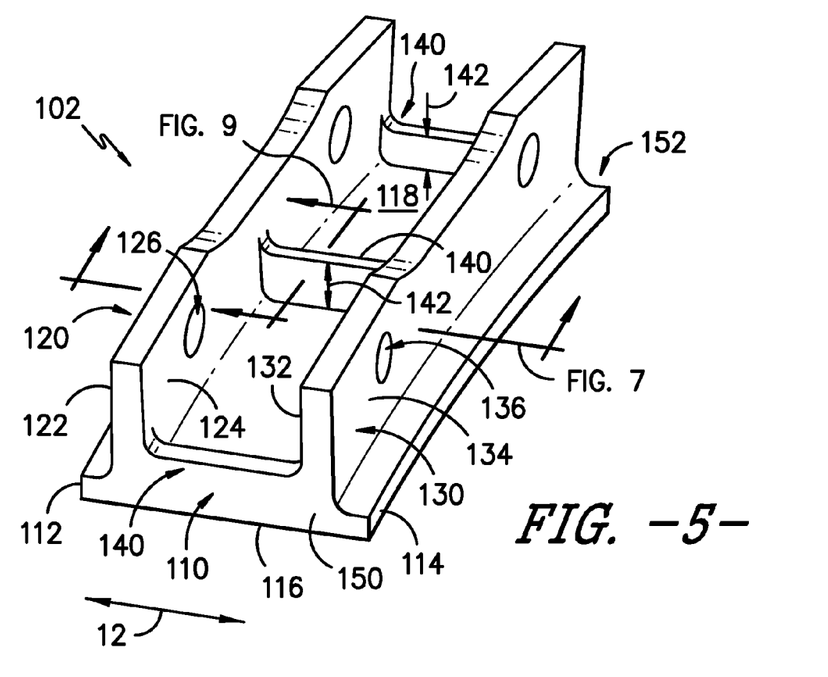
FIG. 5 is a perspective view of a shroud in accordance with another embodiment of the present disclosure.
Figure 6:
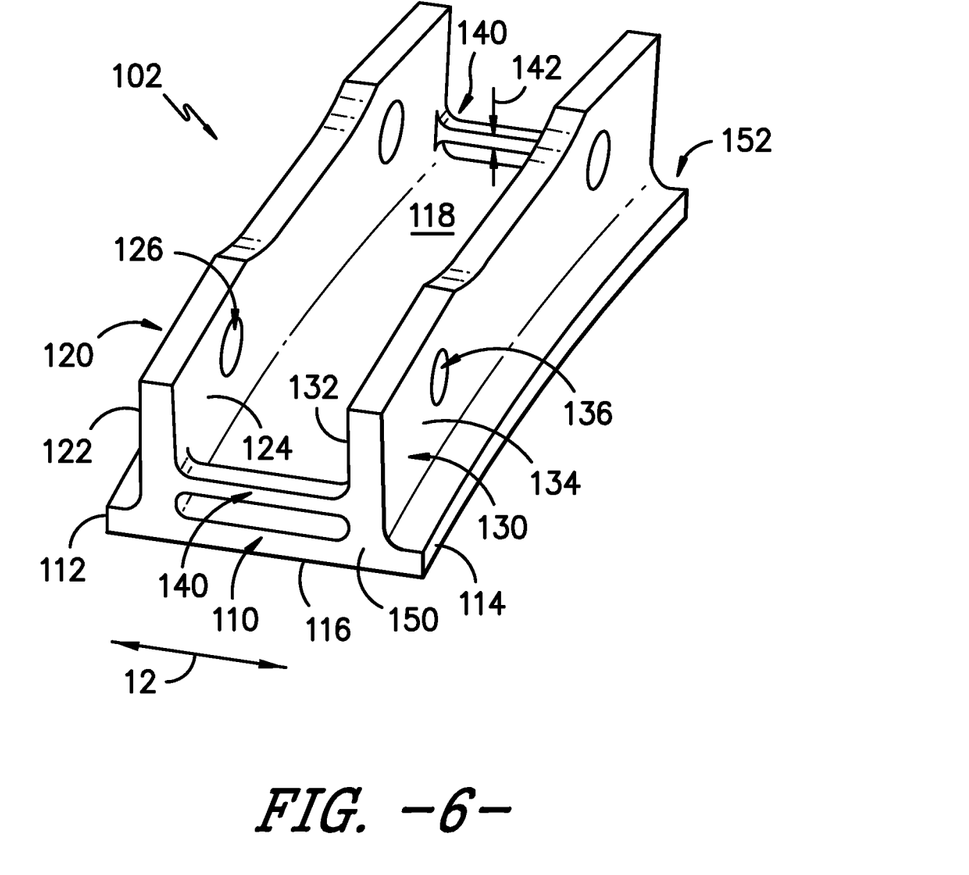
FIG. 6 is a perspective view of a shroud in accordance with another embodiment of the present disclosure.

Referring again to FIGS. 4 through 10, a shroud 102 in accordance with the present disclosure may further include one or more ribs 140. Each rib 140 may be disposed between and in contact with the forward flange 120 and rear flange 130. In some embodiments, as shown in FIGS. 4, 5, 7 and 8, a rib 140 may extend from the shroud body 110, such as from the outer surface 118 thereof. In other embodiments, as shown in FIG. 6, a rib 140 may be spaced from the shroud body 110, such as from the outer surface 118 thereof in the radial direction. In particular, a rib 140 in accordance with the present disclosure may be disposed between and in contact with the rear surface 124 of the forward flange 120 and the forward surface 132 of the rear flange 130. In general, and as discussed above, ribs 140 may advantageously stabilize and provide structural rigidity to the associated shroud 102. In particular, such stabilization and structural rigidity is provided by the contact between the ribs 140 and the flanges 120, 130.

In exemplary embodiments as shown, a rib 140 may extend axially between the forward flange 120 and the rear flange 130, and thus along centerline 12 when the shroud 102 is installed in the engine 10. Alternatively, a rib 140 may extend at a suitable angle to axial between the forward flange 120 and the rear flange 130.

As shown, a shroud body 110 in accordance with the present disclosure extends generally circumferentially between a first side surface 150 and a second side surface 152. These surfaces generally extend axially between the front surface 112 and rear surface 114 of the shroud body 110. In some embodiments, as illustrated in FIGS. 4 and 6, a rib 140 may be positioned at the first side surface 150 and/or at the second side surface 152. Additionally or alternatively, as illustrated in FIG. 5, one or more ribs 140 may be positioned between the first side surface 140 and the second side surface 152. When multiple ribs 140 are utilized, the ribs 140 may in general be circumferentially spaced from each other as shown in FIGS. 4 through 6.

Each rib 140 may further define a height 142, which extends along the radial dimension of the rib 140 as shown, and a length 144, which extends along the dimension of the rib 140 extending between the forward flange 120 and rear flange 130. In some embodiments, as illustrated in FIGS. 4 and 6, each rib 140 has a generally identical height 142 (or maximum height 142 along the length 144). In other embodiments, as illustrated in FIG. 5, the height 142 (or maximum height 142 along the length 144) of one or more ribs 140 may be greater than the height 142 (or maximum height 142 along the length 144) of another one or more ribs 140.

Figure 7:
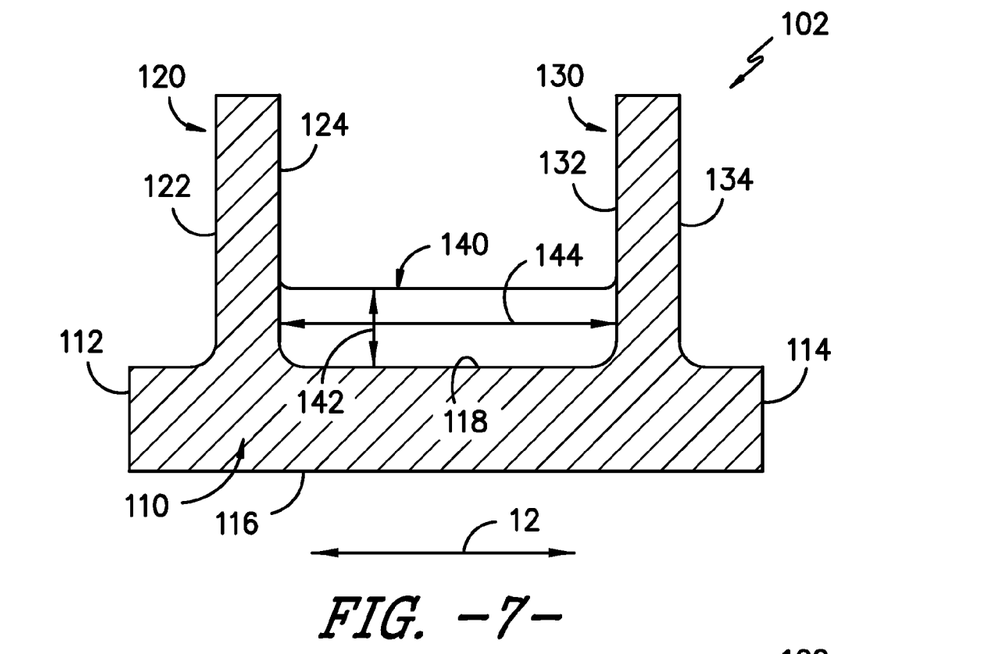
FIG. 7 is a cross-sectional view of a shroud in accordance with one embodiment of the present disclosure.
Figure 8:
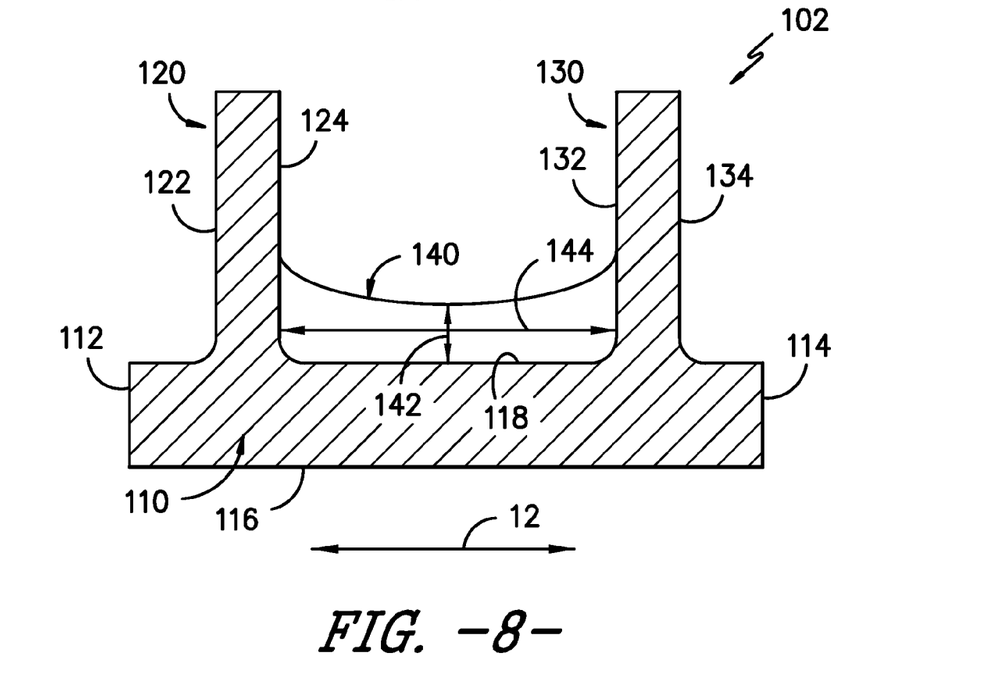
FIG. 8 is a cross-sectional view of a shroud in accordance with another embodiment of the present disclosure.

Further, in some embodiments, as illustrated in FIG. 7, the height 142 may be generally constant throughout the entire length 144. Notably, a generally constant height includes height changes due to chamfers or other manufacturing features at the intersections between the ribs 140 and the forward flange 120 and rear flange 130, as shown in FIG. 7. In other embodiments, as illustrated in FIG. 8, the height 142 may vary through the length 144. For example, as shown, height 142 may taper from the forward flange 120 and/or the rear flange 130 through at least a portion of the length 144.

Figure 9:
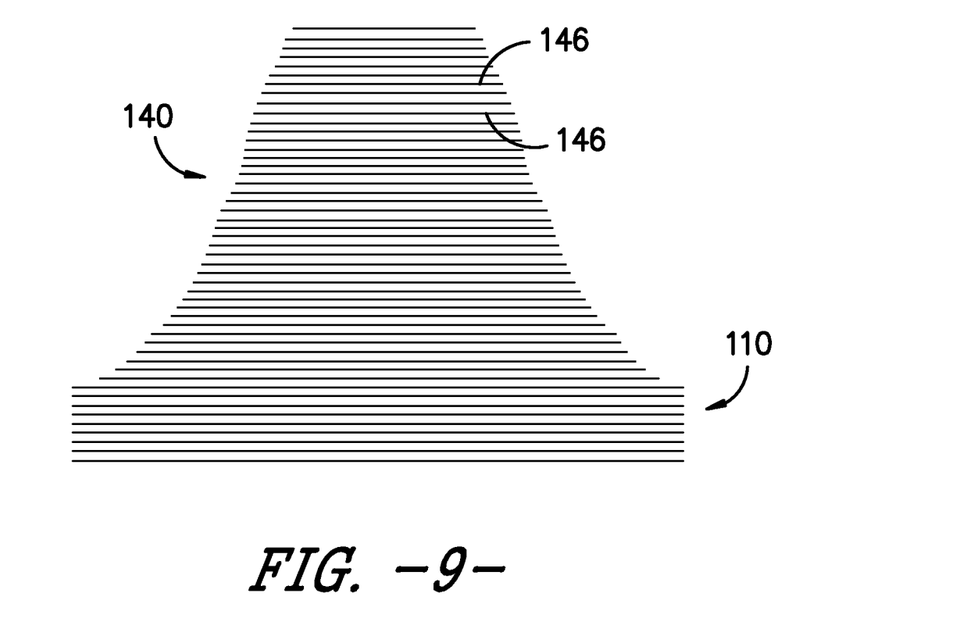
FIG. 9 is a schematic cross-sectional view of a rib of a shroud in accordance with one embodiment of the present disclosure.
Figure 10:
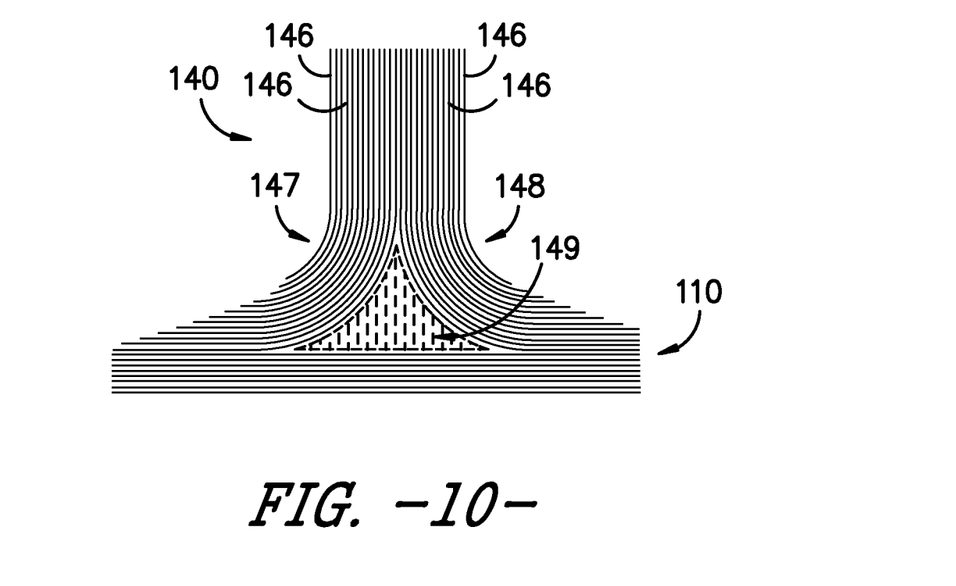
FIG. 10 is a schematic cross-sectional view of a rib of a shroud in accordance with another embodiment of the present disclosure.

As discussed, the shroud body 110, forward flange 120, rear flange 130 and ribs 140 are in exemplary embodiments formed from a ceramix matrix composite material. Referring now to FIGS. 9 and 10, a rib 140 in accordance with the present disclosure may thus in exemplary embodiments be formed from a plurality of ceramic matrix composite plies 146. Each ply 146 may include fibers, such as ceramic fibers, embedded in a ceramix matrix. The fibers may be continuous fibers (extending through an entire length of the ply) or discontinuous fibers (extending through only a portion of a length of the ply).

Further, various configurations of the plies 146 may be utilized to form a rib 140. For example, in some embodiments as illustrated in FIG. 9, a plurality of plies 146 may be stacked along the radial direction. In other embodiments, as illustrated in FIG. 10, one or more pluralities of plies 146 may be bent such that a portion of each plurality of plies is stacked along the radial direction and a portion of the plurality of plies is stacked in the circumferential direction. FIG. 10 illustrates a first ply component 147 and a second ply component 148 each formed from a plurality of plies which are so bent. These components 147, 148 are oriented to face each other to form a rib 140. Additionally, a filler component 149 of ceramic matrix composite material, which may be formed from one or more plies and conventionally known as a "noodle", may be provided to fill a void between the components 147, 148. In still other embodiments, any suitable arrangements of plies of ceramic matrix composite material or ceramic matrix composite material generally may be utilized to form such ribs 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine, the shroud assembly comprising:
   a hanger, the hanger comprising a forward hanger arm, a rear hanger arm axially spaced from the forward hanger arm, a hanger body extending between the forward hanger arm and the rear hanger arm, and a flange extending from the hanger body, the hanger further comprising a bore hole defined in the flange;
   a shroud, the shroud comprising:
      a shroud body comprising a forward surface, a rear surface axially spaced from the forward surface, an inner surface extending between the forward surface and the rear surface, and an outer surface extending between the forward surface and the rear surface and radially spaced from the inner surface;
      a forward flange extending from the outer surface of the shroud body, the forward flange defining a bore hole;
      a rear flange extending from the outer surface of the shroud body, the rear flange axially spaced from the forward flange, the rear flange defining a bore hole; and
      a rib disposed between and in contact with the forward flange and the rear flange; the rib comprising a plurality of plies stacked in a radial direction, wherein each ply of the plurality of plies is substantially parallel to the shroud body outer surface; and
   a pin extending through the bore hole of the hanger and at least one of the bore hole of the forward flange or the bore hole of the rear flange,
   wherein the shroud body, the forward flange, the rear flange, and the rib are formed from a ceramic matrix composite material.

2. The shroud assembly of claim 1, wherein the rib extends axially between the forward flange and the rear flange, and wherein the plurality of plies comprises continuous plies or discontinuous plies.

3. The shroud assembly of claim 2, wherein the rib defines a radially extending height and a length extending between the forward flange and the rear flange, and wherein the height is generally constant throughout the entire length.

4. The shroud assembly of claim 1, wherein the rib defines a radially extending height and a length extending between the forward flange and the rear flange, and wherein the height tapers from at least one of the forward flange and the rear flange through at least a portion of the length.

5. The shroud assembly of claim 3, wherein the rib comprises a plurality of ribs.

6. The shroud assembly of claim 5, wherein each of the plurality of ribs is generally circumferentially spaced from others of the plurality of ribs.

7. The shroud assembly of claim 6, wherein each of the plurality of ribs defines a radially extending height, and wherein the height of at least one of the plurality of ribs is greater than the height of at least another of the plurality of ribs.

8. A gas turbine engine, comprising:
- a compressor;
- a combustion section;
- a turbine; and
- a shroud disposed in one of the compressor or the turbine, the shroud comprising:
  - a shroud body comprising a forward surface, a rear surface axially spaced from the forward surface, an inner surface extending between the forward surface and the rear surface, and an outer surface extending between the forward surface and the rear surface and radially spaced from the inner surface;
  - a forward flange extending from the outer surface of the shroud body;
  - a rear flange extending from the outer surface of the shroud body, the rear flange axially spaced from the forward flange; and
  - a rib disposed between and in contact with the forward flange and the rear flange, the rib comprising a plurality of plies stacked in a radial direction, wherein each ply of the plurality of plies is substantially parallel to the shroud body outer surface, wherein the rib is radially spaced a distance away from the shroud body outer surface.

9. The gas turbine of claim 8, wherein the rib extends axially between the forward flange and the rear flange.

10. The gas turbine of claim 8, wherein the rib defines a radially extending height and a length extending between the forward flange and the rear flange, and wherein the height is generally constant through the entire length.

11. The gas turbine of claim 8, wherein the rib comprises a plurality of ribs.

12. The gas turbine of claim 11, wherein each of the plurality of ribs is generally circumferentially spaced from others of the plurality of ribs.

* * * * *